(12) United States Patent
Day

(10) Patent No.: US 9,857,913 B2
(45) Date of Patent: Jan. 2, 2018

(54) SCANNED PIEZOELECTRIC TOUCH SENSOR DEVICE

(71) Applicant: SYNAPTICS INCORPORATED, San Jose, CA (US)

(72) Inventor: Shawn P. Day, Kowloon (HK)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/346,668

(22) Filed: Nov. 8, 2016

(65) Prior Publication Data

US 2017/0052640 A1 Feb. 23, 2017

Related U.S. Application Data

(63) Continuation of application No. 14/521,335, filed on Oct. 22, 2014, now Pat. No. 9,501,167.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01); *G06F 2203/04105* (2013.01); *G06F 2203/04108* (2013.01)

(58) Field of Classification Search
None
See application file for complete search history.

(56) References Cited

U.S. PATENT DOCUMENTS

| | | |
|---|---|---|
| 5,159,323 A | 10/1992 | Mase et al. |
| 5,942,733 A | 8/1999 | Allen et al. |
| 7,714,845 B2 | 5/2010 | Matsumoto et al. |
| 2003/0067448 A1 | 4/2003 | Park |
| 2005/0237779 A1 | 10/2005 | Kang |
| 2008/0007532 A1 | 1/2008 | Chen |

(Continued)

FOREIGN PATENT DOCUMENTS

WO WO-2014037016 A1 3/2014

OTHER PUBLICATIONS

Search Report dated Apr. 26, 2014 for Application No. PCT/EP2012/003687.

(Continued)

*Primary Examiner* — Christopher Kohlman
(74) *Attorney, Agent, or Firm* — Patterson + Sheridan, LLP

(57) ABSTRACT

Embodiments of the disclosure generally provide an integrated input device that is configured to sense the position and amount of force applied by input objects that are in contact with an input region of an input device. The input device is generally configured to sense the position and amount of force applied by an input object that is in contact with the input region using a piezoelectric material. The input device generally includes a plurality of electrodes that are positioned to measure an electrical characteristic of the piezoelectric layer at different points within the input region to determine the position and/or amount of applied force. The input device may also include one or more components that are able to simultaneously or sequentially sense the position of an input object using a touch sensing technique independent of the electrical properties of the piezoelectric material to sense the input object position.

25 Claims, 7 Drawing Sheets

(56) References Cited

U.S. PATENT DOCUMENTS

| | | |
|---|---|---|
| 2008/0150906 A1 | 6/2008 | Grivna |
| 2008/0174852 A1 | 7/2008 | Hirai et al. |
| 2010/0103121 A1 | 4/2010 | Kim et al. |
| 2010/0219989 A1 | 9/2010 | Asami et al. |
| 2010/0308844 A1 | 12/2010 | Day et al. |
| 2011/0121654 A1 | 5/2011 | Recker et al. |
| 2011/0298479 A1 | 12/2011 | Matsushima |
| 2012/0075221 A1* | 3/2012 | Yasuda ............... B32B 37/02 345/173 |
| 2012/0086667 A1 | 4/2012 | Coni et al. |
| 2012/0127136 A1* | 5/2012 | Schneider ......... G02F 1/13718 345/204 |
| 2012/0133210 A1 | 5/2012 | Moon et al. |
| 2012/0154299 A1 | 6/2012 | Hsu et al. |
| 2012/0212434 A1 | 8/2012 | Bluemler et al. |
| 2012/0268416 A1* | 10/2012 | Pirogov ................ G06F 3/044 345/174 |
| 2013/0162579 A1 | 6/2013 | Modarres et al. |
| 2013/0201134 A1 | 8/2013 | Schneider et al. |
| 2013/0271396 A1* | 10/2013 | Chen ................... G06F 3/0416 345/173 |
| 2014/0165185 A1 | 6/2014 | Lange |
| 2015/0179122 A1 | 6/2015 | Brown et al. |
| 2016/0306481 A1* | 10/2016 | Filiz ................... G06F 3/0414 |

OTHER PUBLICATIONS

S. Ozeri et al. "Static Force Measurement by Piezoelectric Sensors", School of Electrical Engineering. IEEE 2006.

D. Shmilovitz et al. "Static Force Measurement with Piezoelectric Sensors Based on Pseudorandom Sequences", School of Electrical Engineering. IEEE 2008.

\* cited by examiner

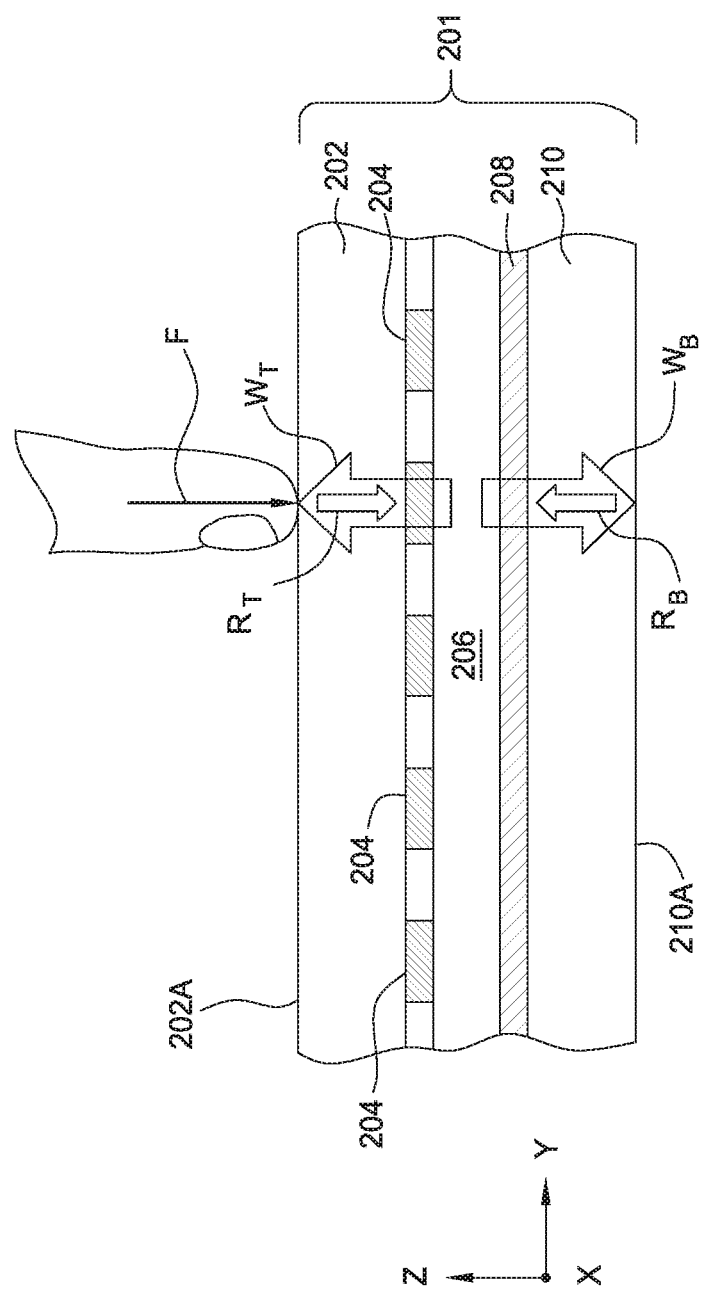

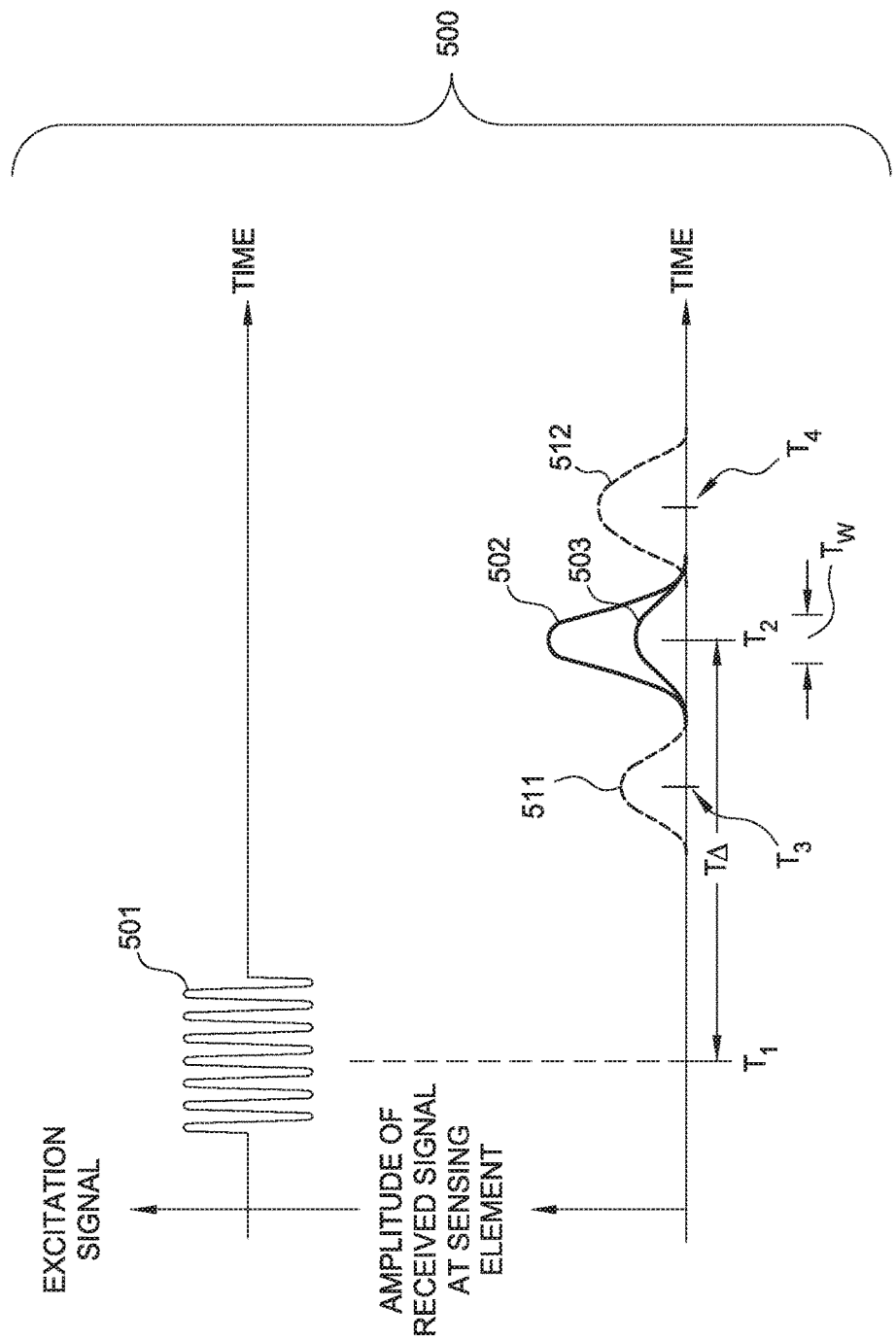

SCANNED PIEZOELECTRIC TOUCH SENSOR DEVICE

CROSS-REFERENCE

This application is a continuation of co-pending U.S. patent application Ser. No. 14/521,335, filed Oct. 22, 2014 and entitled "SCANNED PIEZOELECTRIC TOUCH SENSOR DEVICE". The related application is herein incorporated by reference in its entirety.

BACKGROUND

Field of the Disclosure

Embodiments of the present disclosure generally relate to a system and method for sensing the position of input objects, and the force or pressure applied by input objects to the surface of a touch sensing device.

Description of the Related Art

Input devices including touch sensor devices, also commonly called touchpads or touch sensor devices, are widely used in a variety of electronic systems. A touch sensor device typically includes a device sensing region in which the touch sensor device determines the presence, location and/or motion of one or more input objects, such as a finger. Touch sensor devices may be used to provide interfaces for an electronic system. For example, touch sensor devices are often used as input devices for larger computing systems, such as opaque touchpads integrated in, or peripheral to notebook or desktop computers. Touch sensor devices are also often used in smaller computing systems, such as touch screens integrated in cellular phones. Touch sensor devices are typically used in combination with other supporting components, such as display or input devices found in the electronic or computing system. Examples of some typical touch sensor device applications are components that are formed within or include a touch screen for a desktop computers, a touch screen for a laptop computer, netbook computers, tablets, web browsers, e-book readers, personal digital assistants (PDAs), smart phones and other similar electronic devices.

In some configurations, the touch sensor devices are coupled to these supporting components to provide a desired combined function or to provide a desirable complete device package. Many commercially available touch sensor devices rely on the measurement of an electrical property such as capacitance or resistance in order to determine the presence, location and/or motion of one or more input objects within the touch sensor device's active area. In order to simultaneously measure the position of multiple input objects, typical touch sensors employ an array of independent touch-sensing elements. The touch-sensing elements in the vicinity of any particular input object produce measurement data that can be used to determine the position of that input object, independently from the positions of other input objects that might be present elsewhere in the touch sensor's active area. Typically, a capacitive touch sensor device utilizes two overlapping arrays of sensor electrodes to detect the presence, location and/or motion of input objects. The touch-sensing elements are generally located in the areas where the electrodes overlap one another, and the electrodes are typically connected to controlling electronics with wires or conductive traces.

In most cases, capacitive sensing techniques are not effective for detecting the positions of input objects that have insulating properties, such as dielectric-containing or dielectric-coated objects (e.g., plastic styluses, rubber tipped pens, gloved hands, etc.). Therefore, to overcome this problem, device manufacturers have developed devices that can sense the physical touch of an input object on the surface of the touch sensing device's interface, such as resistive touch sensing devices and piezoelectric touch sensing devices. However, resistive touch sensing devices become unreliable over time, due to the mechanical stresses associated with repetitive movement, repetitive contact of the electrical contacting elements, and the large deflection often required to reliably distinguish between a touched and a non-touched state.

Some touch sensing devices have used piezoelectric materials to sense the presence and force or pressure from an input object. Such devices generally rely on the piezoelectric effect, which causes an electric charge to form in the piezoelectric material when a force is applied. However, the electric charge that is generated by the applied force is transient in nature due to the fact that piezoelectric materials are not perfect insulators and the charge moves or "bleeds away" over time. The transient nature of the generated charge will thus not allow the touch sensing device to detect the presence or non-presence of a stationary input object (e.g., finger) after a very short amount of time.

To construct a two-dimensional array of piezoelectric sensors, suitable for detecting both the position and the applied pressure of one or more input objects at the same time, each sensor in the array would typically need to have a separate sense electrode so that the charge from each sensor could be measured independently. Unfortunately, this approach would require a large number of wires or traces for connecting all the electrodes to the control electronics, and it would be difficult to route all the wires out to the edges of sensors made up of large, dense arrays.

Therefore, there is a need for an apparatus and method of forming and using a touch sensing device that is configured to solve the problems with piezoelectric sensors described above. The touch sensing device also should be inexpensive to produce, reliable in operation, and be formed so that it can be integrated within a desirably sized electronic system.

SUMMARY

Embodiments of the disclosure may provide an input device that is configured to sense the position and the amount of force applied by input objects that are in contact with an input region of an input device. The input device may include a plurality of electrodes that are positioned to measure an electrical characteristic of a piezoelectric material at different points within the input region to determine the position and/or amount force applied by the input object(s). The input device may also include one or more components that are able to simultaneously or sequentially sense the position of an input object using an additional touch sensing technique that does not rely on the electrical properties of the piezoelectric material to sense the position of the input object.

Embodiments of the disclosure may further provide an input device comprising a plurality of first electrodes, a plurality of second electrodes, a plurality of sensing elements, wherein each sensing element comprises a portion of a first electrode, a portion of a second electrode, and a piezoelectric material disposed between the portion of the first electrode and the portion of the second electrode, wherein each first electrode forms part of two or more sensing elements and each second electrode forms part of two or more sensing elements. The input device may further include a processing system electrically connected to each of the first electrodes and each of the second electrodes, and configured to detect forces applied to one or more of the sensing elements by applying a time-varying electrical excitation signal to at least one of the plurality of first electrodes and detecting a resulting electrical signal on one or more of the second electrodes. The first electrodes may in some configurations have an elongated shape, wherein an elongated portion of each of the first electrodes is aligned parallel to a first direction that lies within a first plane. The second electrodes may in some configurations also have an elongated shape, wherein an elongated portion of each of the second electrodes is aligned parallel to a second direction that lies within a second plane, wherein the first plane and the second plane are parallel to one another, and the piezoelectric material is disposed between the first and second planes, the first direction and the second direction are at an angle to each other, so that the second electrodes cross over the first electrodes, and each of the sensing elements is formed at a location where a second electrode crosses over a first electrode.

Embodiments of the disclosure may further provide an input device comprising a plurality of first electrodes, a plurality of second electrodes, a plurality of sensing elements, wherein each sensing element comprises a portion of a first electrode, a portion of a second electrode, and a piezoelectric material disposed between the portion of the first electrode and the portion of the second electrode, wherein each first electrode forms part of two or more sensing elements and each second electrode forms part of two or more sensing elements. The input device may further include a processing system electrically connected to each of the first electrodes and each of the second electrodes, and configured to detect forces applied to each sensing element by applying an excitation signal to at least one of the plurality of first electrodes and monitoring a resulting electrical signal on one or more of the second electrodes to determine an impedance of a portion of a piezoelectric material disposed in a sensing element that comprises a portion of the at least one first electrode and a portion of one of the one or more second electrodes.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5A is a cross-sectional view of a portion of an input device that is configured to sense the position of an input object, according to one or more of the embodiments described herein.

FIG. 5B is a timing diagram illustrating aspects of a process used to sense the position of an input object, according to one embodiment described herein.

Figure 1:
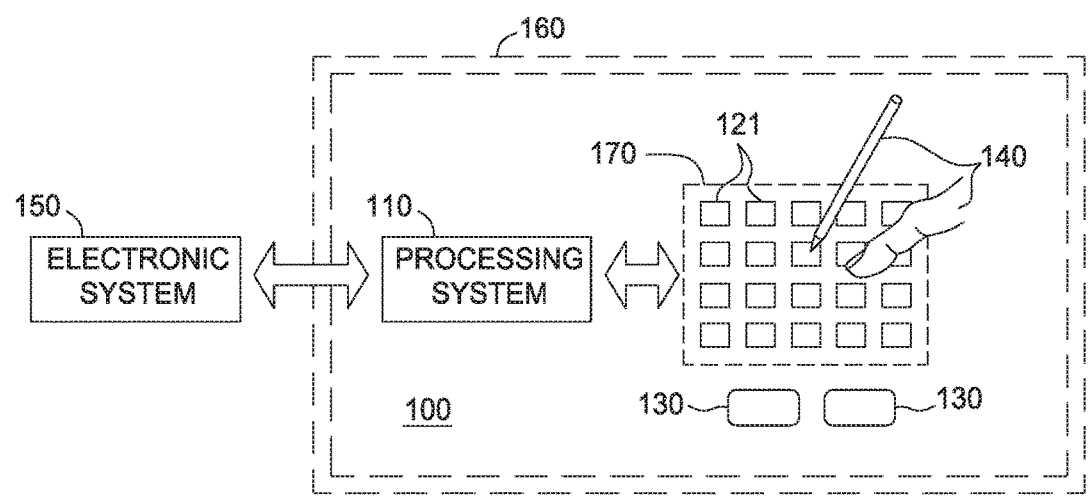
FIG. 1 is a schematic block diagram of an exemplary input device, in accordance with embodiments of the disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description.

General Overview

Embodiments of the disclosure may provide an integrated input device that can be configured to sense the position of stationary or moving input objects, sense the amount of force applied by input objects that are in contact with an input region of the input device, and/or discern the type of input object that is being used. The input device is generally configured to sense the position and amount of force applied by an input object that is in contact with the input region using a piezoelectric material that is disposed proximate or adjacent to a surface of the input region of the input device. The input device generally includes a plurality of electrodes that are positioned to measure an electrical characteristic of the piezoelectric material at different points in order to determine the position and/or amount of force applied by the input object(s).

System Overview

FIG. 1 is a schematic block diagram of an input device 100 integrated into an exemplary touch sensing device 160, in accordance with embodiments of the disclosure provided herein. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Yet other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system 150 using any communication method, such as one or more of the following: buses, networks, and other wired or wireless interconnections. Examples include I2C, SPI, PS/2, Universal Serial Bus (USB), Bluetooth, RF, and IRDA. The electronic system 150 can be integrated within the touch sensing device 160, or can be physically separate from the touch sensing device 160.

In FIG. 1, the input device 100 is shown as a touch sensing device (also often referred to as a "touchpad" or a "touch sensor device") configured to sense input provided by one or more input objects 140 in a device sensing region 170. Example input objects include fingers and styli, as shown in FIG. 1.

Device sensing region 170 encompasses any space above, around, in and/or near an input surface of the input device 100 in which the input device 100 is able to detect user input (e.g., user input provided by one or more input objects 140). The sizes, shapes, and locations of particular sensing elements may vary widely from embodiment to embodiment. In some embodiments, the device sensing region 170 includes a two dimensional surface of the input device 100 that is able detect the position of the input object. However, in some embodiments, the device sensing region 170 may also extend from the input surface of the input device 100 in one or more directions into space until signal-to-noise ratios prevent sufficiently accurate input object detection. The distance to which this device sensing region 170 extends from the input surface in a particular direction (e.g., normal to the surface) may be on the order of less than a millimeter, millimeters, centimeters, or more, and may vary significantly with the type of sensing technology used and the accuracy desired. Thus, some embodiments sense input that comprises contact with an input surface (e.g., a touch surface) of the input device 100, contact with an input surface of the input device 100 coupled with some amount of applied force or pressure, and/or a combination thereof, or no contact with any surfaces of the input device 100. In various embodiments, an input surface may be provided by a surface of a casing within which the sensing elements reside. In some embodiments, the device sensing region 170 has a rectangular shape when projected onto an input surface of the input device 100.

A processing system 110 is shown as part of the input device 100. The processing system 110 is configured to operate the hardware of the input device 100 to detect input in the device sensing region 170. The processing system 110 comprises parts of or all of one or more integrated circuits (ICs) and/or other circuitry components. The processing system 110 may in some cases include a central processing unit (CPU) (not shown), memory (not shown), and support circuits (or I/O) (not shown). The CPU may be one of any form of computer processor that is used for controlling various system functions and support hardware and monitoring the processes being controlled by and within the input device 100. The memory is coupled to the CPU, and may be one or more of a readily available memory, such as random access memory (RAM), read only memory (ROM), floppy disk, hard disk, or any other form of digital storage, local or remote. Software instructions (or computer instructions) and data may be coded and stored within the memory for instructing the CPU. The software instructions may include a program that determines which tasks are to be performed at any instant in time. The support circuits are also connected to the CPU for supporting the processor in a conventional manner. The support circuits may include cache, power supplies, clock circuits, timing circuits, input/output circuitry, subsystems, and the like.

In some embodiments, the processing system 110 also comprises electronically-readable instructions, such as firmware code, software code, and/or the like. In some embodiments, components composing the processing system 110 are located together, such as near the sensor electrodes in the input device 100. In other embodiments, components of processing system 110 are physically separate from each other, and may be positioned in a desirable location within the input device 100. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data, such as sensor signals and positional information, and reporting modules for reporting information. Further example modules include sensor operation modules configured to detect user input, identification modules configured to identify gestures such as mode changing gestures, and mode changing modules for changing operation modes.

In some embodiments, the processing system 110 responds to user input (or lack of user input) in the device sensing region 170 directly by causing one or more actions. Example actions include changing operation modes, as well as GUI actions, such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

The processing system 110 may perform any appropriate amount of processing on the electrical signals in producing the information provided to the electronic system. For example, the processing system 110 may digitize analog electrical signals obtained from the sensing elements 121. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

In some embodiments, the processing system 110 is configured to perform one or more of the steps within an impedance measurement technique process or a vibratory measurement technique process, which are discussed in further detail below. In one embodiment, the processing system comprises sensing circuitry (e.g., sensing circuitry 290 of FIG. 2A) configured to drive one or more sensor electrodes and sense the resulting signals derived from the driven electrodes and input received from one or more input objects. The processing system may comprise an AC signal generator and a sensor control element that each may be selectively coupled to one or more of the sensor elements 121 using switching type components, such as one or more shift registers, multiplexers, and/or switches. The AC signal generator may be selectively coupled between a ground and at least one sensor electrode disposed in the array of sensor electrodes 282. The AC signal generator may comprise a reference level signal generator that is selectively coupled between a ground and at least one of the other sensor electrode disposed in the array of sensor electrodes 282. The reference level signal generators and signal generator may each include a power source that is configured to provide or generate a voltage on or deliver a current to at least one of the sensor electrodes.

In some embodiments, the processing system 110 comprises one or more devices that are adapted to detect, monitor and/or analyze a resulting signal that is derived from the touch sensing signal delivered to the sensor and/or the amount of charge generated by the piezoelectric material during the performance of the vibratory measurement technique. Therefore, the processing system 110 is configured to measure the current, voltage and/or relative phase of the received resulting signals by the at least one of the sensor electrodes.

"Positional information" as used herein broadly encompasses absolute position, relative position, velocity, acceleration, and other types of spatial information in any desired dimensional space (e.g., zero-dimensional, one-dimensional, two-dimensional, three-dimensional, etc. space). In one example, "zero-dimensional" positional information includes near/far or contact/no contact information. In one example, "one-dimensional" positional information includes position, velocity and/or acceleration along an axis. In one example, "two-dimensional" positional information, such as position, velocity and/or acceleration in the plane of the device sensing region 170. In one example, "three-dimensional" positional information, such as position, velocity and/or acceleration, includes information relating to spatial information in 3-D space. Further examples include other representations of spatial information. Historical data regarding one or more types of positional information may also be determined and/or stored in memory, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the device sensing region 170, or some other functionality. FIG. 1 shows buttons 130 near the device sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the device sensing region 170 overlaps at least part of an active area of a display screen of the touch sensing device 160. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the touch sensing device 160 may share physical elements. For example, some embodiments may utilize some of the same electrical components for displaying and sensing. As another example, the touch sensing device 160 may be operated in part or in total by the processing system 110.

Touch Sensing Assembly Configuration Examples

Figure 2A:
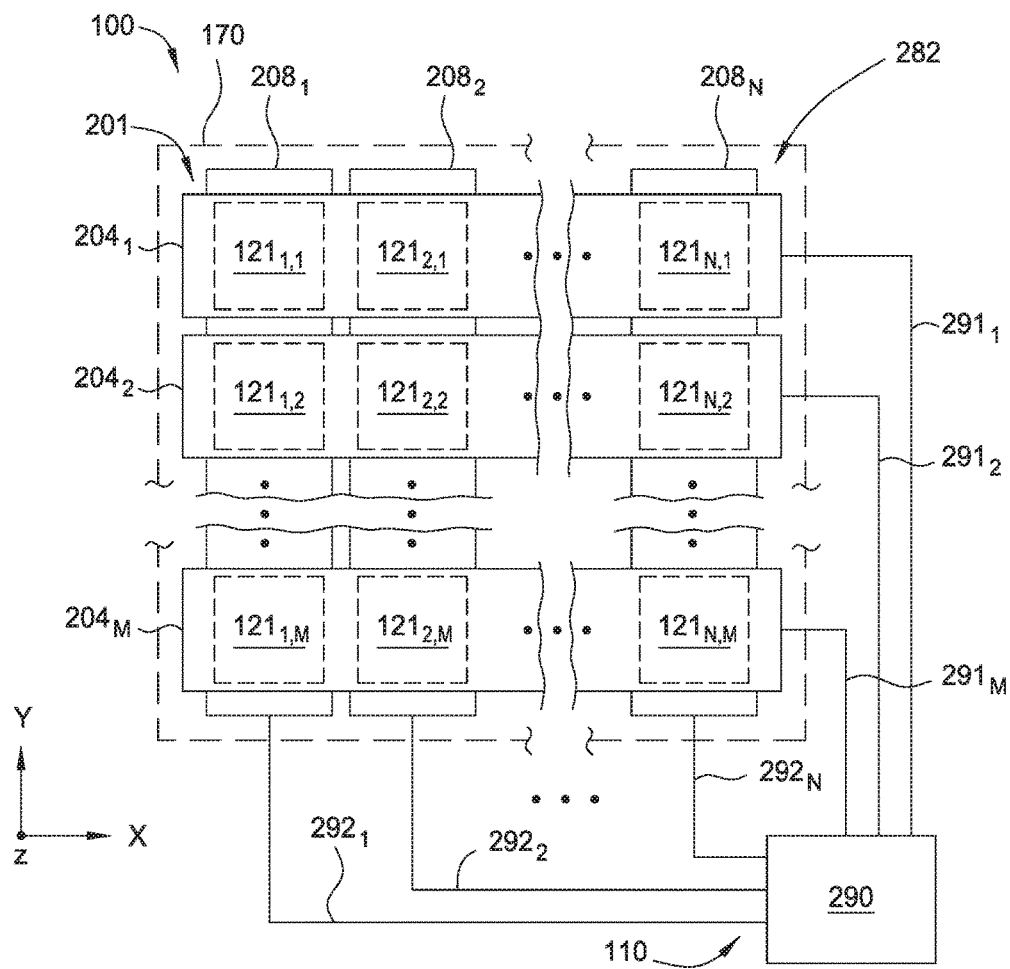
FIG. 2A is a schematic plan view of an input device, according to one or more of the embodiments described herein.
Figure 2B:
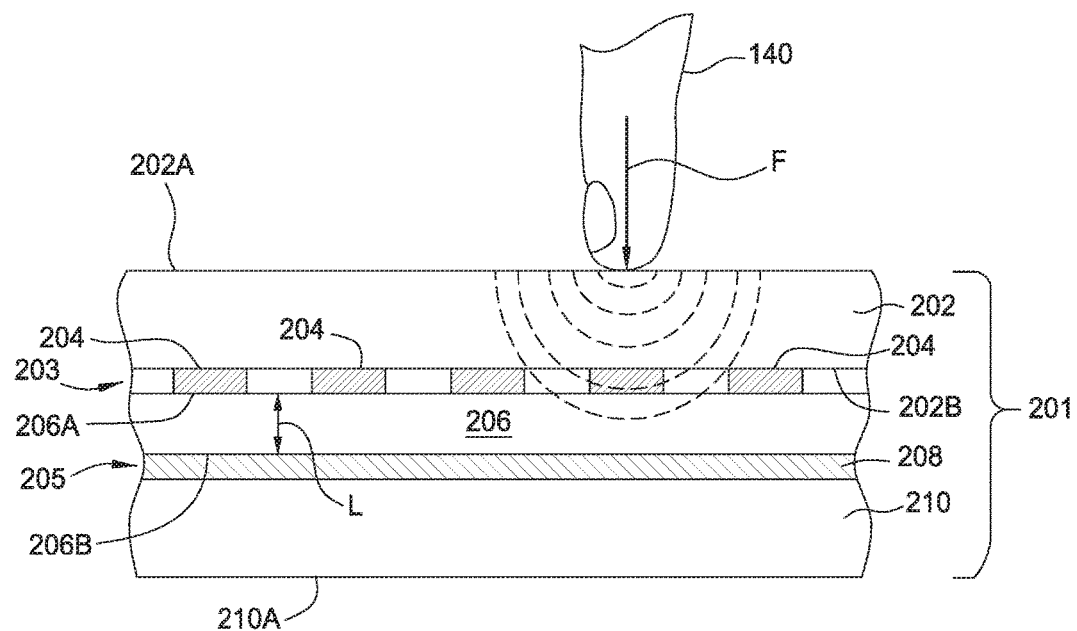
FIG. 2B is a cross-sectional view of a portion of an input device, according to one or more of the embodiments described herein.
Figure 3:
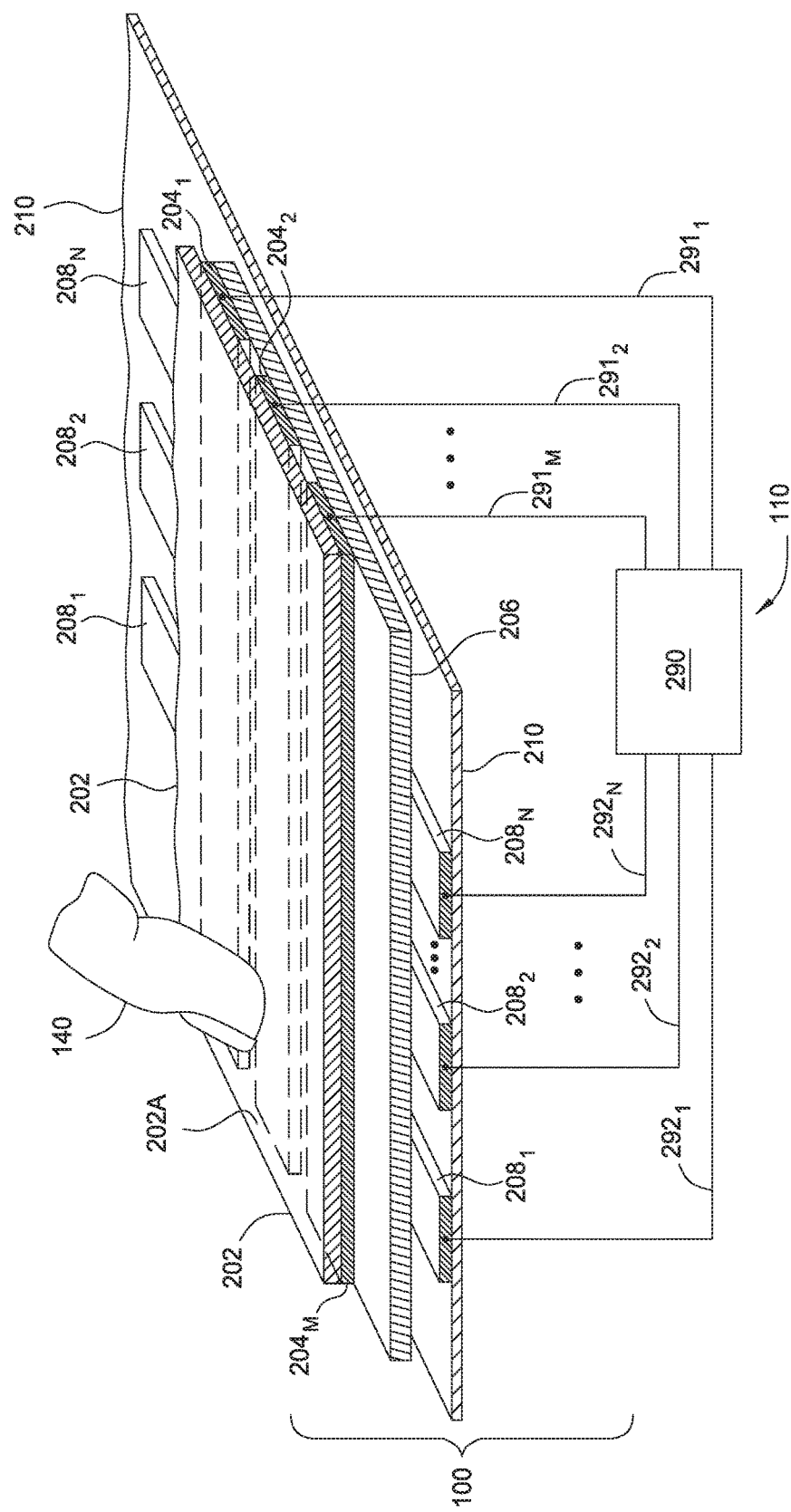
FIG. 3 is a schematic and partial isometric cross-sectional view of a portion of an integrated input device, according to one embodiment described herein.

FIG. 2A is a schematic plan view of the input device 100 illustrating a sensing assembly 201 that includes a pattern of sensor electrodes that are positioned to sense the position of an input object disposed on or within the device sensing region 170, according to one or more of the embodiments described herein. FIG. 2B is a cross-sectional view of only a portion of the sensing assembly 201 within the input device 100, according to one or more of the embodiments described herein. FIG. 3 is a schematic partial isometric section view of the sensing assembly 201 formed within the input device 100. As shown in FIGS. 2A-2B and 3, the input device 100 includes an input surface 202A of an interface layer 202, a rear layer 210, a first group 203 of electrically conductive sensor electrodes 204 and a second group 205 of electrically conductive sensor electrodes 208. In the example shown in FIG. 2A, the sensor electrodes each have an elongated shape, and the elongated portion of each sensor electrode 204 is aligned parallel with the X direction, while the elongated portion of each sensor electrode 208 is aligned parallel with the Y direction. In other embodiments, the electrodes may have different shapes and different alignments, including irregular shapes and little or no alignment. Each group of sensor electrodes is formed as a separate layer of the device, with an intervening layer of piezoelectric material (e.g., piezoelectric layer 206) located between the two groups. Furthermore, each sensor electrode is electrically coupled via a conductor (e.g., items $291_1$-$291_M$ or $292_1$-$292_N$) to touch sensing circuitry 290, which may comprise part or all of processing system 110. In FIGS. 2A and 3, each electrode 204 is separately identified using a subscript notation in the range from 1 to M, where M represents the total number of electrodes 204. Likewise, each electrode 208 is separately identified using a subscript in the range from 1 to N, where N represents the total number of electrodes 208. As FIG. 2B is only a partial view of the sensing assembly 201, the electrodes 204 and 208 are not labeled with a subscript notation. The total number of electrodes will generally depend on the size and aspect ratio of the device sensing region 170 and the desired position detection accuracy of the input device 100. In one example with a 10 cm×15 cm touch surface, the sensor electrodes 204 and 208 are spaced apart on a 0.5 mm pitch, resulting in a 20×30 array of electrodes 204 and electrodes 208, respectively.

The input device 100 further comprises a plurality of sensing elements 121 that each include at least a portion of a piezoelectric material (e.g., a region of the piezoelectric layer 206 in FIGS. 2B and 3) disposed between at least a portion of one sensor electrode 204 and a portion of one sensor electrode 208. As illustrated in FIG. 2A, the sensing elements 121 are formed at the overlapping areas or regions of the elongated sensor electrodes 204 and 208.

In operation, one or more input objects 104, such as a finger or a stylus, applies a force F (FIG. 2B) to the input surface 202A. This force is transmitted through the interface layer 202 and through the first group of sensor electrodes 204 into the piezoelectric layer 206. The piezoelectric layer is supported from below by rear layer 210 and the second group of electrodes 208, so that the force applied by the input object 104 results in a compressive force within the piezoelectric material.

In general, when a piezoelectric material is subjected to a compressive force, an electrical charge is generated within the material and the magnitude of the generated electrical charge is dependent upon the amount of force F applied. In a conventional piezoelectric sensing device, this charge can be measured by detecting the resulting voltage change between the discrete sets of upper and lower electrodes. However, in configurations where the sensor electrodes are shared among multiple sensing elements 121, such as in FIGS. 2A-2B and 3, charges generated within multiple sensing elements 121, due perhaps to the simultaneous presence of forces from multiple input objects, may aggregate their effects on the generated resulting voltage detected on any particular sensor electrode using conventional measurement techniques. The aggregate effect will cause the information representing the individual applied forces on the individual sensor regions to become mixed together and lost. Furthermore, since the piezoelectric material in the piezoelectric layer 206 is not a perfect insulator, any charge generated by a change in force F applied by an input object will gradually bleed away if that input object thereafter remains stationary and applies a constant force. Thus, after a period of time, stationary objects on the surface of the touch sensor will become undetectable using conventional piezoelectric techniques.

In order to scan through the two-dimensional array of sense elements 121 and measure the force applied to each region independently, as well as to measure static, unchanging forces, it is necessary to make use of the novel disclosure described below.

Impedance Measurement Technique

Piezoelectric materials, by virtue of the same physical structure that produces the electrical charge, also exhibit a change in electrical impedance when a force is applied. Whereas the generated electrical charge is a function of the change in the force F applied, the measured impedance of the material is a function of the static force applied, and thus allows for the reliable detection of unmoving objects. Furthermore, due to the configuration of the sensor electrodes in the sensing assembly 201, it is possible for the processing system 110 to individually address each sensing element 121 and independently measure the force applied within each sensing element 121.

Therefore, in a first mode of operation, the impedance of the piezoelectric material within each sensing element 121 can be measured, either one-at-a-time, or in batches, or using other coded addressing techniques. For example, the forces applied to sensing elements $121_{1,1}$, $121_{2,1}$ through $121_{N,1}$ can be simultaneously measured as follows. First, touch sensing circuitry 290 applies a time-varying voltage excitation signal to sensor electrode $204_1$ via electrical connection $291_1$, while simultaneously holding all of the other sensor electrodes 204 at one or more fixed voltages via the remaining electrical connections 291. At the same time, touch sensing circuitry 290 holds the sensor electrodes $208_1$-$208_N$ at one or more fixed voltages, while measuring the electrical current flowing through the electrical connections $292_1$-$292_N$. In this scenario, the time-varying excitation voltage applied to electrode $204_1$ will couple through the piezoelectric material in sensing element $121_{1,1}$ onto electrode $208_1$, and, if electrode $208_1$ is held at a fixed voltage, will induce an AC current to flow in electrode $208_1$ via electrical connection $292_1$ and touch sensing circuitry 290. This AC current will depend on the impedance of the piezoelectric material in region $121_{1,1}$, and therefore will depend in turn on the force applied by an input object in that same region. Thus, measurement of the AC current provides a direct measurement of the force F applied to the corresponding sensing element. Likewise, the forces applied in sensing elements $121_{2,1}$ through $121_{N,1}$ can be measured at the same time, using the same techniques with the remaining sensor electrodes $208_2$-$208_N$ and electrical connections $292_2$-$292_N$.

Next, the forces applied in sensing elements $121_{1,2}$, $121_{2,2}$ through $121_{N,2}$ can be measured by applying the time-varying voltage excitation signal to sensor electrode $204_2$ while simultaneously holding all of the other sensor electrodes 204 at one or more fixed voltages, and performing the same current measurements described above for sensor electrodes $208_1$-$208_N$. In this fashion, the entire two-dimensional array of sensing elements can be scanned, one row at a time, in order to provide a full two-dimensional image of all the forces applied by one or more input objects 104.

It should be noted in the description above that the rows can be scanned out in any order, and it is not necessary to proceed sequentially from sensor electrode $204_1$ through $204_M$. Furthermore, multiple rows can be excited simultaneously in various coded sequences, and the resulting measurements reconstructed into the two-dimensional image of forces present across all of the sensing elements 121 using, for example, a matrix computation. Such coded sequences might provide various improvements in signal-to-noise ratio, immunity to electrical interference, etc. Also note that the roles of sensor electrodes 204 and 208 can be reversed, with sensor electrodes 208 employed as the excitation electrodes and sensor electrodes 204 employed as the measurement electrodes. In this case, the sensing elements would be scanned out column-by-column, rather than row-by-row.

In some embodiments, in order to determine if an input object 140 is in contact with a portion of the device sensing region 170, as well as to determine the amount of force applied by an input object to the touch sensor surface, it may be desirable for the processing system 110 to compare the measured impedances for each of the sensing elements 121 with baseline impedance values that were measured at a time prior to the present measurement. The baseline impedance values used in the comparison may have been stored in the memory of the processing system 110. Alternately, each presently measured impedance can be compared with other concurrent or recently measured impedances from different sensing elements 121 in order to determine if an input object is interacting with the device sensing region 170. In another embodiment, each presently measured impedance can be compared with an average of other measured impedance values in order to determine if an input object is interacting with the device sensing region 170. Impedance values that exceed some prior defined value or percentage of the average may be indicative of an input object interacting with the device sensing region 170. Also, the difference between the presently measured impedance and a prior measured impedance, or average impedance, can be used to determine the magnitude of the force applied by the input object to each sensing element 121 in the device sensing region.

Vibratory Measurement Technique

In some cases, due to the time constants involved, required scanning frequencies, material properties, or other constraints on the design of the touch sensing circuitry 290, it may be undesirable to employ the impedance measurement technique described above. In such cases, a second technique described here can be used to measure the applied forces.

It is well known that applying a time-varying voltage across a piezoelectric material causes that piezoelectric material to expand and contract. In the case of the piezoelectric touch sensor described herein, the same physical phenomenon can be used as follows to detect the presence of one or more input objects.

Turning again to the embodiment shown in FIGS. 2A-2B and 3, a time-varying voltage excitation signal can be applied to sensor electrode $204_1$ while holding all of the other sensor electrodes 204 and 208 in the sensing assembly 201 at one or more fixed voltages. The application of such an excitation voltage to the sensor electrode $204_1$ will induce mechanical oscillations (vibrations) within the piezoelectric material throughout the entire row of sensing elements $121_{1,2}$, $121_{2,1}$ through $121_{N,1}$. For most efficient operation, it may be desirable that the frequency of the excitation signal be at or near the natural resonant frequency of the sensing elements. Once the mechanical oscillations have been established, the electrical signal on sensor electrode $204_1$ can be switched from a time-varying voltage to a fixed voltage. As the mechanical oscillations continue due to mechanical inertia, they will induce charges in the piezoelectric material due to the piezoelectric effect, and those induced charges will in turn induce currents in sensor electrodes $208_1$-$208_N$, which can be measured in the same way as for the impedance measurement technique described above.

Due to the mechanical damping always present in such a system, the mechanical oscillations will decay over time until they are no longer detectable. The rate of decay depends on the exact nature of the mechanical damping in the system, which in turn is dependent upon any external forces applied to the system. Therefore, by measuring the rate of decay of the induced currents in sensor electrodes $208_1$-$208_N$ after the time-varying voltage excitation signal has been removed, the rate of decay of the mechanical oscillations can be directly inferred and therefore the magnitude of any forces applied by input objects can be determined.

The rate of decay of the induced current in each sensor electrode can be determined by measuring the amplitude of the detected current at a point in time after the excitation signal has been removed, and then measuring the amount of time required for the amplitude of the current to decrease to a predetermined lower level, such as a percentage of the initial measurement. Alternatively, the rate of decay of the induced current can be determined by measuring the amplitude of the current at a point in time after the excitation signal has been removed, and then measuring the amplitude of the current again at some predetermined time thereafter. Yet another approach would be to measure the amplitude of the current at a predetermined time after the removal of the excitation signal under the assumption that the initial magnitude of the current is approximately the same for each measurement cycle.

Next, the forces applied in sensing elements $121_{1,2}$, $121_{2,2}$ through $121_{N,2}$ can be measured by applying the time-varying voltage excitation signal to sensor electrode $204_2$ in order to induce mechanical oscillations in the corresponding sensing elements. Once the mechanical oscillations have been established, the electrical signal on sensor electrode $204_2$ can be switched from a time-varying voltage to a fixed voltage and the same current measurements described above can be performed using sensor electrodes $208_1$-$208_N$. In this fashion, the entire two-dimensional array of sensing elements can be scanned, one row at a time, in order to provide a full two-dimensional image of all the forces applied.

It should be noted in the description above that the rows can be scanned out in any order, and it is not necessary to proceed sequentially from sensor electrode $204_1$ through $204_M$. Furthermore, multiple rows can be excited simultaneously in various coded sequences, and the resulting measurements reconstructed into the two-dimensional image of forces present across all of the sensing elements 121 using, for example, a matrix computation. Such coded sequences might provide various improvements in signal-to-noise ratio, immunity to electrical interference, etc. Also note that the roles of sensor electrodes 204 and 208 can be reversed, with sensor electrodes 208 employed as the excitation electrodes and sensor electrodes 204 employed as the measurement electrodes. In this case, the sensing elements would be scanned out column-by-column, rather than row-by-row.

Note that there may be some mechanical coupling between adjacent sensing elements 121, and therefore some crosstalk between the measured signals. However, due to the relative thinness of the piezoelectric material compared with its X-direction and Y-direction extent, such coupling should be very small and acceptable in many applications. Further note that the decay rate due to mechanical damping is independent of the initial magnitude of the oscillation. Thus, by measuring the initial amplitude of the induced current right after the application of the excitation signal, and then measuring the time required for the amplitude to decay by a fixed percentage, any variations in the initial excitation amplitude are automatically compensated for.

Therefore, by use of the one or more of the measurement techniques described herein, such as the impedance or vibratory measurement techniques, the position and amount of force applied by one or more input objects can be independently determined. By use of either the impedance measurement technique or vibratory measurement technique, independent measurements of the force applied to a sensing element can be made, irrespective of a different force being applied to other regions of the device sensing region 170. As noted above this is not possible in conventional designs due to the aggregation of the charge created by the presence of two or more forces applied to different portions of the device sensing region 170.

Conventional designs rely on the detection of instantaneous charges generated in the piezoelectric material when an input object moves or changes its pressure on the surface of the input device. These charges dissipate when the input object remains stationary with a constant pressure, and therefore a stationary input object cannot be detected. With the present disclosure, charges are generated by the applied time-varying voltage and/or induced vibrations, and these generated charges are modulated by the presence of an input object touching the input surface. Since these charges are generated continually by repeated application of the time-varying excitation signal, even a stationary input object can be detected. The processing system can filter out and ignore the instantaneous charges generated directly by movement of an input object because these charges occur at a much lower frequency than the frequency of the applied time-varying excitation signal.

Power Conservation Mode

In some embodiments, the processing system 110 may implement a power conservation mode (or "sleep" mode) wherein the processing system is completely powered down and consumes no power while the sleep mode is active. While in the sleep mode, the normal scanning processes described above cannot be performed because they require electrical power in order to operate.

However, the piezoelectric effect that occurs when an input object applies a force to one or more sensing elements 121 does not require an external supply of power because it results from a property of the piezoelectric material itself. In effect, some of the energy from the force applied by the input object is converted into an electrical charge that can induce a voltage change on one or more of the sensor electrodes 204 or 208. Therefore, processing system 110 can be further configured to harvest the energy from the piezoelectric effect, and to use the harvested energy to wake itself up from the sleep mode and re-enter a normal operating mode.

In conventional devices, only a low-power (not a zero-power) sleep mode can be implemented if it is necessary to be able to wake up the device via the touch from an input object. In order to respond to a touch, a conventional device must use at least a small amount of power to repeatedly scan the sensor to look for the presence of an input object.

The ability to implement a zero-power sleep mode may provide significant advantages for applications such as remote controls that must operate on battery power for very long periods of time while not in use, but at the same time must always be ready to wake up when touched.

Sensing Assembly Device Structure Examples

FIGS. 2A-2B and 3 illustrate two groups of sensor electrodes, such as sensor electrodes $204_1$-$204_M$ and sensor electrodes $208_1$-$208_N$, that are formed on different planes. The planes are aligned generally parallel to each other. For clarity of illustration and description, the sensor electrodes are illustrated in a pattern of simple rectangles (e.g., elongated sensor electrodes). It is contemplated that the pattern of sensing electrodes may comprises a plurality of sensor electrodes having other configurations, such as polar arrays, repeating patterns, non-repeating patterns, non-uniform arrays a single row or column, or other suitable arrangement. Further, the sensor electrodes may be any shape such as circular, rectangular, diamond, star, square, non-convex, convex, non-concave concave, etc. The sensor electrodes are coupled to the processing system 110 and utilized to determine the presence (or lack thereof) of an input object 140 in the device sensing region 170. The sensor electrodes are typically ohmically isolated from each other. That is, one or more insulators separate the sensor electrodes and prevent them from electrically shorting to each other.

Referring to FIG. 2B, the input device 100 generally includes a sensing assembly 201 that includes an interface layer 202, a first group of sensor electrodes 203, a piezoelectric layer 206, a second group of sensor electrodes 205, and a rear layer (e.g., rear layer 210). In some embodiments, the input device includes touch sensing circuitry 290. The piezoelectric layer 206 is positioned so that pressure within the interface layer 202, due to a force "F" applied to the input surface 202A of the interface layer 202 by an input object 140, will cause deformation in the piezoelectric layer 206. The first group of sensor electrodes 203, the piezoelectric layer 206 and/or the second group of sensor electrodes 205 are all positioned so that when a force "F" is applied to the input surface 202A by an input object 140, the applied force "F" will be transmitted to the piezoelectric layer 206. The dashed lines shown in FIG. 2B are generally provided to illustrate the application of a force F that is transferred to the piezoelectric layer 206 through the various contacting intervening components found within the sensing assembly 201, such as the interface layer 202 and the electrodes 204. In general, it is desirable for the interface layer 202, first group of sensor electrodes 203, piezoelectric layer 206, second group of sensor electrodes 205 and rear layer 210 to be in intimate contact with each other in a stacked relationship, since this configuration will generally assure that a force F applied by an input object 140 will be transmitted to the piezoelectric layer so that the input object's presence can be sensed by the touch sensing circuitry 290. Thus, it is desirable for no gaps to be formed between adjacently positioned layers within the sensing assembly 201 stack.

In general, the interface layer 202 includes a material that is able to reliably transmit the force "F" by the input object 140 to the piezoelectric layer 206. The interface layer 202 may include a layer that comprises a glass, ceramic, plastic, polymer, metal or other similar material. In one example, the interface layer 202 includes a glass sheet that is between about 0.1 and about 5 mm thick. Typically, the interface layer 202 will include a material that is durable enough not be marred by the repeated interaction with the input object 140 and is able to withstand normal wear and tear experienced with most commercial touch sensing devices used today. In some cases, the rear layer 210 is formed from the same, or similar, material as the interface layer 202.

In some configurations of the sensing assembly 201, the first group of sensor electrodes 203 may include a plurality of sensor electrodes 204, such as sensor electrodes 204 illustrated in FIG. 2B, that are each proximate to, or disposed over, a portion of a surface 206A of the piezoelectric layer 206 and the second group of sensor electrodes 205 may include a plurality of sensor electrodes 208 that are each proximate to, or disposed over, a portion of a surface 206B of the piezoelectric layer 206. The first and second groups of sensor electrodes are typically disposed on opposite sides of the piezoelectric layer 206. In one example, the sensor electrodes 204 in the first group of sensor electrodes 203 are deposited on the surface 206A of the piezoelectric layer 206 and the sensor electrodes 208 in the second group of sensor electrodes 205 are deposited on the surface 206B of the piezoelectric layer 206. However, in some cases the sensing assembly 201 may be formed by sequentially depositing the various layers (e.g., first array of sensor electrodes, piezoelectric layer and second array of sensor electrodes) on a surface of the interface layer 202, or alternately on a surface of the rear layer 210.

In one embodiment, the first group of sensor electrodes 203 and second group of sensor electrodes 205 each comprise an array of sensor electrodes that are each arrayed in at least one direction, such as the first group of electrodes are arrayed to form a regular pattern of sensor electrodes 204 in the Y-direction and the second group of electrodes are arrayed to form a regular pattern of sensor electrodes 208 in the X-direction. While the first and second groups of sensor electrodes are illustrated in FIGS. 2A-2B and 3 as being oriented in an orthogonal relationship to each other, this configuration is not intended to be limiting as to the scope of the disclosure described herein, since the first and second groups of sensor electrodes could be aligned relative to each other at other angles. In one example, the angle between the first and second groups of sensor electrodes may be greater than zero degrees and less than 180 degrees. In one example, the first group of electrodes is arrayed to form a regular pattern of sensor electrodes 204 in a first-direction and the second group of electrodes is arrayed to form a regular pattern of sensor electrodes 208 in a second direction, where the first and second directions are not parallel to each other.

The sensor electrodes 204 and the sensor electrodes 208 generally comprise a conductive material that, for example, may include a material selected from the group of a transparent conductive oxide (e.g., indium tin oxide (ITO)), transparent organic material (e.g., poly(3,4-ethylenedioxythiophene), PEDOT) or conductive material, such as silver, nickel, tin and copper. The sensor electrodes 204 and the sensor electrodes 208 may be formed using a physical vapor deposition (PVD) process, screen printing process, conductive tape bonding process or the like. In one example, the sensor electrodes 204 and 208 may comprise an ITO material that has a thickness of 5 micron ($\mu$m) or less, such as 1 micron ($\mu$m) or less. In some examples, the ITO material may have a thickness between about 0.1 microns ($\mu$m) and about 1 $\mu$m thick.

In some embodiments, the piezoelectric layer 206 comprises a sheet material that will exhibit a change in at least one electrical property within a region of the sheet of material when a force is applied to that region of the material. In one configuration, the electrical property that changes includes the complex impedance (i.e., impedance $Z=|Z|e^{j\theta}=R+jX$) of the material, or also referred to herein as simply the impedance, and/or the amount of generated static charge (e.g., voltage) due to the application of a force. Due to the crystal structure of piezoelectric materials (e.g., electric dipole moments in the formed material), the measured impedance (Z) will vary when a force is applied to a region of the piezoelectric layer 206 by the input object 140. In contrast to the piezoelectric materials discussed herein, conventional materials do not exhibit a measurable change in impedance when a force is applied. Other conventional pressure-sensing devices rely on mechanical deflection of the input surface when a force is applied, whereby this deflection can be measured by a suitable measurement technique. Unfortunately, such mechanical deflection can lead to performance degradation over time as repeated deflection can cause the material properties to change. The requirement for mechanical deflection also leads to mounting and assembly difficulties. With the present disclosure, only the strain created within the piezoelectric material by an applied force is necessary for detection of an input object, and the touch surface doesn't not exhibit any significant deflection.

In one example, the piezoelectric layer 206 may include a natural or synthetic material, such as polyvinylidene fluoride (PVDF), lead zirconate titanate (e.g., PZT materials), quartz, lead titanate, barium titanate ($BaTiO_3$), lead titanate ($PbTiO_3$), potassium niobate ($KNbO_3$), lithium niobate ($LiNbO_3$), lithium tantalate ($LiTaO_3$), sodium tungstate ($Na_2 WO_3$), zinc oxide (ZnO), bismuth ferrite ($BiFeO_3$), sodium niobate ($NaNbO_3$), bismuth titanate ($Bi_4Ti_3O_{12}$), or sodium bismuth titanate ($Na_xBi_yTiO_z$). In one example, the piezoelectric layer 206 may include a sheet of material that is between about 0.1 microns ($\mu$m) and about 5 mm thick. In one example, the piezoelectric layer 206 may include a layer of material that has facets (not shown) that are formed across the layer to electrically and/or mechanically isolate the sensing elements 121 formed in the device sensing region 170 from each other. In one example, the piezoelectric layer 206 includes a sheet or layer of a polymeric material, such as a PVDF material that is between about 1 $\mu$m and about 1000 $\mu$m thick. In one configuration, a thin polymeric material containing piezoelectric layer 206 can be made transparent, or at least non-opaque, such that when used with sensor electrodes that are also transparent or non-opaque (e.g., transparent conductive oxide (TCO) or PEDOT containing electrodes), the sensing assembly 201 can be positioned over a display surface of a display device without obscuring the information displayed by the display device.

In some configurations, the sensing assembly 201 includes a laminated assembly that includes the interface layer 202, the first group of sensor electrodes 203, the piezoelectric layer 206, the second group of sensor electrodes 205 and a rear layer 210 that are bonded together to form a complete assembly that can be integrated with the other components found in the touch sensing device 160. In one example, the piezoelectric layer 206 may include a layer that is formed over the interface layer 202 and sensor electrodes 204 by use of a CVD or spin-on deposition process. The sensor electrodes 208 and rear layer 210 may then be laminated together with the interface layer 202, sensor electrodes 204 and piezoelectric layer 206 to form at least part of the sensing assembly 201. Alternately, the sensing assembly 201 may be formed in a reverse order or in any order that is desired to form a useable sensing assembly 201. In some embodiments, the rear layer 210 may form part of another useful element within the touch sensing device 160, such as the rear layer 210 may be the color filter (CF) glass in a LCD display, which is not shown in FIG. 2B, but would be disposed below (e.g., −Z-direction) the rear layer 210.

Additional Touch Sensing Techniques

In some embodiments of the input device 100, to help the processing system 110 determine the actual input object's position and discern what type of input object 140 is interacting with the device sensing region, one or more additional touch sensing techniques can be used simultaneously or sequentially with the touch sensing processes described above. By use of one or more of these additional touch sensing techniques, the accuracy of the touch detection process can be improved and/or additional information about the interaction of the input object 140 with the device sensing region 170 can be provided to the input device 100 and the touch sensing device 160.

Capacitive Sensing Techniques

In addition to piezoelectric sensing techniques, input device 100 can also use capacitive sensing techniques to detect the position and/or presence of input objects 140 within the device sensing region 170. One advantage of capacitive sensing techniques is that they can detect the presence and position of input objects proximate to but not in contact with input surface 202A.

In some embodiments of the disclosure provided herein, a capacitive sensing technique and one or more of the piezoelectric sensing techniques, which are discussed above, may be combined together. Thus, in some embodiments, the sensor electrodes 204 and/or 208 may be used to perform capacitive touch sensing operations in addition to piezoelectric sensing operations. In one example, as illustrated in FIG. 2A, touch sensing circuitry 290 is adapted to perform a capacitive sensing process (e.g., an absolute sensing and/or transcapacitive sensing process) using one or more of the sensor electrodes 204 and/or 208. Generally, one or more of the piezoelectric touch sensing processes discussed above can be used in combination with one or more of the capacitive sensing techniques discussed below to determine additional information about one or more input objects (e.g., whether it is an insulating or conductive input object, a hovering input object, the position and velocity of the input object, etc.).

Figure 4:
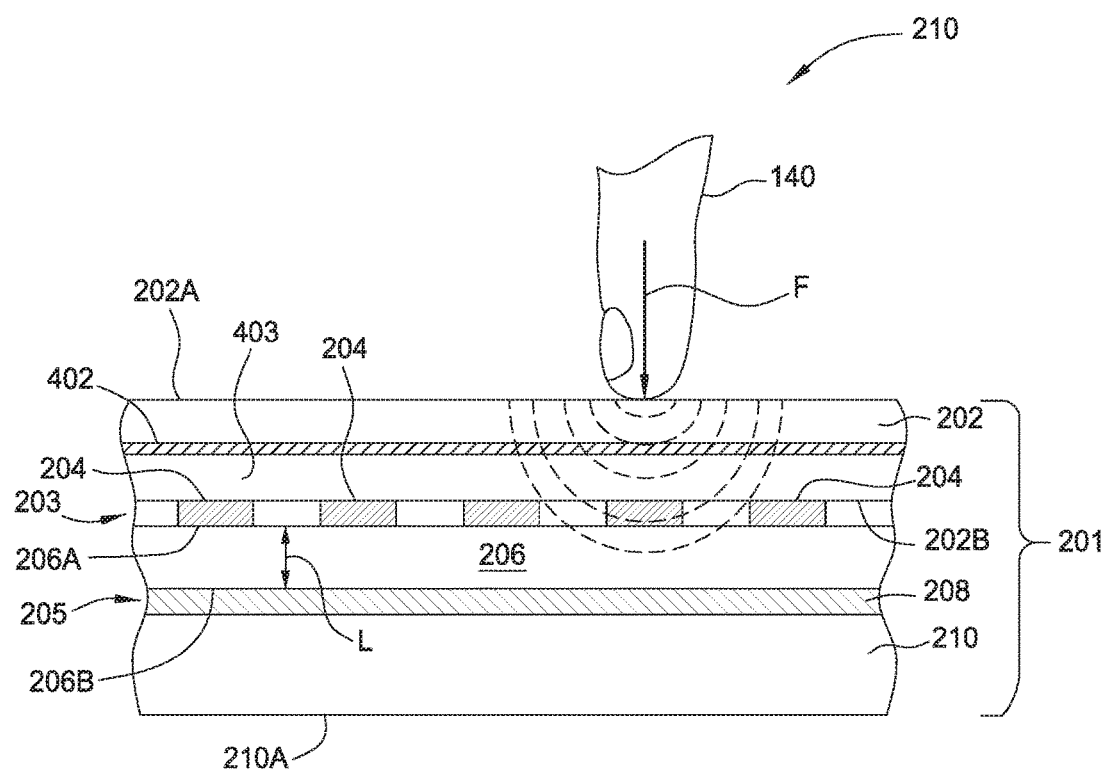
FIG. 4 is a cross-sectional view of a portion of an input device that includes a capacitive sensing electrode layer, according to one or more of the embodiments described herein.

Alternately, in one embodiment, as shown in FIG. 4, an additional set of capacitive sensing electrodes may be separately disposed within a sensor electrode layer 402 of a formed sensing assembly 201. The separate capacitive sensing electrodes may include transmitter electrodes (not shown) and/or receiver electrodes (not shown) that are formed in one or more layers within the sensor electrode layer 402 and are used by the touch sensing circuitry 290 to perform one or more capacitive sensing operations.

In some configurations, absolute sensing and transcapacitive sensing operations are performed by the touch sensing circuitry 290 during the one or more of the touch sensing processes described above. In one embodiment, the sensing assembly 201 includes an interface layer 202, a sensor electrode layer 402, an intermediate layer 403, a first group of sensor electrodes 203, a piezoelectric layer 206, a second group of sensor electrodes 205, and a rear layer 210, which are laminated together to form a complete assembly, and the sensor control circuitry 290. The intermediate layer 403 may comprise the same material as the interface layer 202 or the rear layer 210 and the sensor electrodes formed in the sensor electrode layer 402 may include a TCO material or other similar conductive material. The term "capacitive sensing electrode" is used herein to broadly to cover the use of the sensor electrodes 204, sensor electrodes 208 and/or the sensor electrodes (not shown) that are disposed in the sensor electrode layer 402.

As briefly discussed above, some capacitive implementations utilize "absolute capacitance" (or "self capacitance") sensing methods based on changes in the capacitive coupling between the sensing electrodes and an input object. In various embodiments, an input object near the sensing electrodes alters the electric field near the sensing electrodes, thus changing the measured capacitive coupling.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling between the sensor electrodes. The application of capacitive sensing techniques within the touch sensing process can be useful, since capacitive sensing techniques can provide information regarding the position of input objects that are hovering over, but are not in contact with, the sensing region 170.

During operation, in one or more embodiments, the capacitive sensing and piezoelectric sensing techniques discussed above may occur during at least partially overlapping periods. In another embodiment, capacitive sensing and piezoelectric sensing techniques may occur during non-overlapping periods. In various embodiments, the capacitive sensing technique(s) may occur between piezoelectric sensing technique periods.

Acoustic Touch Sensing Techniques

Acoustic touch sensing is another technique that can be used by the input device 100 to detect the position and/or presence of an input object 140 within the device sensing region 170. The acoustic technique can be performed using the sensing assembly 201 structure and components described above, and thus can also be used in combination with one or more of the other piezoelectric sensing and capacitive touch sensing techniques discussed above. The acoustic technique can provide accurate detection and measurement of the positions of both conductive and non-conductive input objects (e.g., a passive stylus) on the device sensing region 170, including light touches. In most cases, a non-conductive input object will not be detected by a capacitive touch sensing technique. Therefore, if an object is detected only by the acoustic technique and not by the capacitive technique, it can be determined that the input object is non-conductive. Alternatively, of an object is detected by both the acoustic technique and the capacitive technique, it can be determined that the input object is conductive. Based on this determination, a non-conductive stylus or pen can be readily distinguished from a conductive finger or other input object.

FIG. 5A is a cross-sectional view of a portion of the input device 100, according to one or more of the embodiments described herein. FIG. 5B is a timing diagram illustrating aspects of an acoustic reflection process 500 used to sense the position of an input object using the input device 100 illustrated in FIG. 5A, according to one embodiment described herein. The illustrated portion of the input device 100 may include an array of sensor electrodes 204 and an array of sensor electrodes 208 that are each coupled to touch sensing circuitry 290 that is formed within the processing system 110. In general, the acoustic reflection sensing process makes use of acoustic vibrations that are generated by portions of the piezoelectric layer 206 and travel through the sensing assembly 201 and interface layer 202 to detect the acoustic absorption due to an input object 140 that is in contact the input surface 202A. By exciting the sensor electrodes 204 and/or 208 one row or column at a time using short excitation signals, an acoustic wave can be generated that propagates through the interface layer 202 to the top surface of the sensing assembly 201. As illustrated in FIG. 5A, a generated acoustic wave $W_T$ travels from the piezoelectric layer 206 towards the input surface 202A. If no input object 140 is present, a significant portion of the acoustic wave $W_T$ will be reflected back down toward the piezoelectric layer 206, which is shown as a reflected wave $R_T$. The reflected wave $R_T$ will arrive back at the piezoelectric layer 206 after a time $\Delta T$ that is determined by the thickness of interface layer 202 and by the speed of propagation of the acoustic wave through the material from which it is constructed. When the reflected wave arrives at the piezoelectric layer 206, it can be detected by touch sensing circuitry 290, as described below.

Whenever an input object 140 is touching the input surface 202A over a sensing element 121 (e.g., a sensor electrode row and column intersection), the input object will absorb some of the acoustic wave $W_T$'s energy and the reflected wave $R_T$ will be smaller in amplitude than the reflected wave that would have been formed if an input object was not present. Thus, an acoustic reflection "image," or two dimensional array of reflection measurements taken across the device sensing region 170 will provide a map of the shapes and positions of objects contacting the touch surface.

Referring to FIGS. 5A and 5B, an acoustic reflection process 500 may include applying a first electrical excitation signal 501 at time $T_1$ to one or more sensor electrodes 204 (FIG. 2A). The first electrical excitation signal 501 will generate acoustic waves, such as acoustic wave $W_T$, in the sensing assembly 201 via the physical oscillation of the piezoelectric layer 206. In one configuration, the first electrical excitation signal 501 is a time-varying signal that is delivered at a desired amplitude to generate the acoustic wave. After the acoustic wave has propagated to the input surface 202A and been absorbed and/or reflected by the arrangement of input objects contacting that surface, the reflected acoustic wave $R_T$ will propagate back toward the piezoelectric layer 206 where it will generate electrical signals due to the piezoelectric effect. At that time, the electrical signals can be detected by measuring the currents on electrodes 208 that are induced by the piezoelectric effect.

As shown in FIG. 5B, at a sensing element 121 the detected signal will be larger in amplitude 502 if the acoustic wave is substantially reflected at the input surface 202A, or smaller in amplitude 503 if the acoustic wave is substantially absorbed by an input object touching the input surface 202A in the region proximate to the sensing element. By recording the amplitude of the detected signal (or another value based on the amplitude of the detected signal) for each sensing element 121, an image of all the input objects touching the input surface 202A can be constructed.

In some embodiments, it may be desirable to store a baseline image constructed from signals detected at a time when there are no input objects touching the input surface 202A. Then, by looking at the difference between a newly acquired image and the baseline image, the presence of input objects can be reliably determined wherever such a difference is significant.

Referring again to FIG. 5A, another acoustic wave $W_B$ may propagate downward from the piezoelectric material when the excitation signal is applied. In general, this downward-propagating acoustic wave is undesirable, and reflections from surface 210A may propagate back up toward the piezoelectric material and interfere with the measurement. However, by designing the device so that the thickness and/or material properties of layer 210 are different from the thickness and/or material properties of interface layer 202, the propagation time of the undesirable reflected acoustic wave $R_B$ can be made either shorter or longer than the propagation time $\Delta T$ of the desired reflected wave $R_T$. As a result, the potentially interfering signal will arrive either before (signal 511 at time $T_3$ in FIG. 5B) or after (signal 512 at time $T_4$ in FIG. 5B) the desired signal, and will therefore not interfere with it. Touch sensing circuitry 290 can simply ignore the signal generated at times $T_3$ and $T_4$, and record only the signal measured around time $T_2$. The period of time during which the signal is measured can be referred to as a timing window, shown as $T_W$ in FIG. 5B.

As discussed above, the acoustic technique can be used either alone, or in conjunction with one of the other touch sensing techniques described earlier.

Some of the embodiments of the disclosure provided herein may utilize one or more of the touch sensing processes described above in conjunction with FIGS. 2A-5B in order to determine information about the interaction of the input object 140 with the device sensing region 170 of an input device 100. The information generated by one or more of these techniques can then be used by the input device 100 to control some aspect of the processes running on the touch sensing device 160. By use of the information received from one or more of these processes, the positions of (and forces applied by) one or more input objects can be ascertained. In one example, a capacitive sensing process and a piezoelectric sensing process are used to generate information relating to one or more hovering input objects and force input information relating to one or more input objects in contact with the device sensing region 170. In another example, a piezoelectric sensing processes and a capacitive sensing process are used to generate accurate positional information and force input information about one or more input objects that are interacting with the device sensing region 170, and to distinguish between conductive and non-conductive input objects. In another example, a piezoelectric sensing process and an acoustic reflection sensing process are used to generate accurate positional information and force input information about one or more input objects that are interacting with the device sensing region 170. In yet another example, a piezoelectric sensing process, a capacitive sensing process and an acoustic reflection sensing process are used to generate accurate positional information and force input information about one or more input objects that are interacting with the device sensing region 170.

The embodiments and examples set forth herein were presented in order to best explain the present technology and its particular application and to thereby enable those skilled in the art to make and use the present technology. Those skilled in the art will recognize that the foregoing description and examples have been presented for the purposes of illustration and example only. The description as set forth is not intended to be exhaustive or to limit the present technology to the precise form disclosed. While the foregoing is directed to embodiments of the present disclosure, other and further embodiments of the disclosure may be devised without departing from the basic scope thereof, and the scope thereof is determined by the claims that follow.

What is claimed is:

1. An input device, comprising:
   a first array comprising a first plurality of elongated sensor electrodes aligned in parallel in a first direction;
   a second array comprising a second plurality of elongated sensor electrodes aligned in parallel in a second direction, the second direction different than the first direction; and
   a piezoelectric material layer disposed between the first array and second array; and
   a processing system configured to:
   deliver a first electrical signal to a first elongated sensor electrode of the first plurality of elongated sensor electrodes;

maintain one or more second electrodes of the second plurality of elongated sensor electrodes at a reference voltage level;

sense, after the first electrical signal has been delivered, a fluctuation in an electrical characteristic of a region of the piezoelectric material layer over time;

detect a presence or an absence of an input object by detecting a change in the sensed electrical characteristic of the region, wherein detecting the changes in the sensed electrical characteristic comprises:

receiving a second electrical signal from a second electrode in the second plurality of elongated sensor electrodes while maintaining the reference voltage level on the one or more second electrodes;

receiving a third electrical signal from the second electrode, wherein the third electrical signal is generated by applying a fourth electrical signal to the first electrode and maintaining the reference voltage level on the second electrode at a first time, wherein the received second electrical signal is received at a second time; and comparing the received second electrical signal with the received third electrical signal.

2. The input device of claim 1, wherein the processing system further comprises:

an electrical circuit coupled to each of the second plurality of elongated sensor electrodes, wherein the electrical circuit is configured to provide the reference voltage level to the one or more second sensor electrodes of the second plurality of elongated sensor electrodes; and a sensor circuit coupled to each elongated sensor electrode of the second plurality of elongated sensor electrodes, wherein the sensor circuit is configured to receive the second electrical signal and the third electrical signal.

3. The input device of claim 1, wherein the processing system further comprises:

a signal generating device selectively coupled to each of the first plurality of elongated sensor electrodes to provide the first electric signal to one or more elongated sensor electrodes of the first plurality of elongated sensor electrodes.

4. The input device of claim 3, wherein the processing system further comprises:

a reference signal generating device selectively coupled to each elongated sensor electrode of the first plurality of elongated sensor electrodes.

5. The input device of claim 1, wherein:

the piezoelectric material layer comprises a polymeric material, and each of the first plurality and the second plurality of elongated sensor electrodes comprises a non-opaque and electrically conductive material.

6. The input device of claim 1, wherein receiving the second electrical signal from the second electrode received by the one or more of the second elongated sensor electrodes further comprises:

simultaneously measuring a resulting electrical signal from two or more elongated sensor electrodes of the second plurality of elongated sensor electrodes.

7. The input device of claim 1, wherein the processing system is further configured to:

sequentially deliver an electrical signal to one or more elongated sensor electrodes of the first plurality of elongated sensor electrodes, and simultaneously measure an electrical signal received by two or more of the second plurality of elongated sensor electrodes.

8. The input device of claim 1, wherein the processing system further comprises:

a capacitive sensing circuit coupled to the second plurality of elongated sensor electrodes, wherein the capacitive sensing circuit is configured to receive a resulting signal from one or more elongated sensor electrodes of the second plurality of elongated sensor electrodes during a capacitive sensing operation performed by the input device.

9. The input device of claim 8, wherein the second plurality of elongated sensor electrodes are disposed between an input surface of an interface layer and the first plurality of elongated sensor electrodes, and the input surface is positioned to receive input from an input object.

10. The input device of claim 1, further comprising:

a third electrode layer that comprises a third array of sensor electrodes that are each coupled to a capacitive sensing circuit.

11. The input device of claim 1, wherein the processing system further comprises:

a capacitive sensing circuit coupled to the first plurality of elongated sensor electrodes and the second plurality of elongated sensor electrodes, wherein the capacitive sensing circuit is configured to:

drive a first elongated sensor electrode of the first plurality of elongated sensor electrodes for transcapacitive sensing; and receive a resulting signal from one or more of the second plurality of elongated sensor electrodes during a capacitive sensing operation performed by the input device.

12. The input device of claim 1, wherein the first direction and the second direction are parallel to a common plane, and each of the first plurality of elongated sensor electrodes cross over each of the second plurality of elongated sensor electrodes.

13. The input device of claim 1, further comprising:

a display device having a display region, wherein the piezoelectric material layer and the first and second arrays are disposed over the display region.

14. A method of determining a position of an input object using a input device, the method comprising:

applying a first electrical signal to a first electrode of a first plurality of elongated sensor electrodes;

maintaining one or more second electrodes of a second plurality of elongated sensor electrodes at a reference voltage level, wherein a piezoelectric material layer is disposed between the first plurality of elongated sensor electrodes and the second plurality of elongated sensor electrodes;

sensing a fluctuation in an electrical characteristic of a region of the piezoelectric material layer over time after the first electrical signal has been applied; and detecting a presence of an input object that is in contact with the input device by detecting a change in the sensed electrical characteristic of a region of the piezoelectric material layer over time, wherein detecting the change in the sensed electrical characteristic comprises:

receiving a second electrical signal from a second electrode in the second plurality of elongated sensor electrodes while maintaining the reference voltage level on the one or more electrodes;

receiving a third electrical signal from the second electrode, wherein the third electrical signal is generated by applying a fourth electrical signal to the first electrode and maintaining the reference voltage level on the second electrode at a first time, wherein the received second electrical signal is received at a second time; and comparing the received second electrical signal with the received third electrical signal.

15. The method of claim 14, wherein detecting the change in the sensed electrical characteristic of the region of the piezoelectric material layer over time further comprises:

storing information relating to the third electrical signal in a memory, wherein comparing the received second electrical signal with the received third electrical signal further comprises comparing the stored information relating to the third electrical signal with information relating to the second electrical signal.

16. The method of claim 15, wherein the second value is derived by measuring an electrical characteristic of the region of the piezoelectric material layer at a second time.

17. The method of claim 14, further comprising:

detecting a change in an electrical characteristic of a region of the piezoelectric material layer over time after a second electrical signal has been applied to the first electrode of the first plurality of elongated sensor electrodes;

comparing the detected change in the electrical characteristic of the region over time after the second electrical signal was applied with the detected change in the electrical characteristic of the region over time after the first electrical signal was applied; and determining that the input object is in contact with the input device based on the comparison of the detected changes in the electrical characteristic after the first electrical signal and second electrical signal were applied.

18. The method of claim 14, wherein detecting the change in the sensed electrical characteristic of the region of the piezoelectric material layer over time comprises:

measuring an electrical characteristic of the region of the piezoelectric material layer at a first time, wherein the electrical characteristic has a first value; and comparing the first value with a second value stored in memory; and determining that the input object is in contact with the input device based on the comparison of the first value and the second value.

19. The method of claim 14, wherein detecting the change in the sensed electrical characteristic of the region of the piezoelectric material layer over time comprises:

detecting a change in an electrical characteristic of a region of the piezoelectric material layer over time after a second electrical signal has been applied to the first electrode, wherein the detected change in the electrical characteristic of the region over time after the second signal has been applied is performed when the input object is not in contact with a sensing region of the input device; and comparing the detected change in the electrical characteristic of the region over time after the second electrical signal was applied with the detected change in the electrical characteristic of the region over time after the first electrical signal was applied.

20. The method of claim 14, further comprising:

maintaining the first electrode of the first plurality of elongated sensor electrodes at a second reference voltage level after applying the first electrical signal to the first electrode, and wherein detecting the change in the electrical characteristic further comprises comparing a detected electrical characteristic of the region of the piezoelectric layer at a first time with a detected electrical characteristic of the region of the piezoelectric layer at a second time.

21. The method of claim 14, wherein the reference voltage level is ground.

22. The method of claim 14, further comprising:

receiving a resulting signal from one or more electrodes of the second plurality of elongated sensor electrodes during a capacitive sensing operation performed by the input device.

23. The method of claim 14, further comprising:

driving the first electrode for transcapacitive sensing; and receiving a resulting signal from one or more electrodes of the second plurality of elongated sensor electrodes while driving the first elongated sensor electrode.

24. A method of determining force applied by one or more input objects to a input device, the method comprising:

applying a first electrical signal to a first electrode of a first plurality of elongated sensor electrodes;

maintaining a second plurality of elongated sensor electrodes at one or more reference voltage levels, wherein a piezoelectric material layer is disposed between the first plurality of elongated sensor electrodes and the second plurality of elongated sensor electrodes;

receiving, while maintaining the reference voltage level on the second plurality of elongated electrodes, a second electrical signal using a second electrode of the second plurality of elongated sensor electrodes;

responsive to removing the first electrical signal from the first electrode, determining a decay rate of the second electrical signal, wherein the decay rate reflects mechanical oscillations induced within the piezoelectric material layer; and determining force measurements using the determined decay rate.

25. The method of claim 24, wherein the second electrical signal comprises a current signal, wherein determining the decay rate of the second electrical signal comprises:

measuring a first current amplitude value of the current signal at a first time after removing the first electrical signal from the first electrode; and performing one of:

measuring a second current amplitude at a second time occurring after the first time; and determining an amount of time for an amplitude of the current signal to decrease from the first current amplitude value to a predetermined second current amplitude value.

\* \* \* \* \*